(12) United States Patent
Lee et al.

(10) Patent No.: US 11,750,493 B2
(45) Date of Patent: Sep. 5, 2023

(54) CORRELATING CAPTURED PACKETS WITH SYNTHETIC APPLICATION TESTING

(71) Applicant: NetScout Systems, Inc., Westford, MA (US)

(72) Inventors: Timothy Robert Lee, Norfork, AR (US); Robert Alan Vogt, Colorado Springs, CO (US)

(73) Assignee: NetScout Systems, Inc., Westford, MA (US)

( * ) Notice: Subject to any disclaimer, the term of this patent is extended or adjusted under 35 U.S.C. 154(b) by 0 days.

(21) Appl. No.: 17/976,414

(22) Filed: Oct. 28, 2022

(65) Prior Publication Data

US 2023/0155917 A1 May 18, 2023

Related U.S. Application Data

(60) Provisional application No. 63/278,909, filed on Nov. 12, 2021.

(51) Int. Cl.
*G06F 15/173* (2006.01)
*H04L 43/55* (2022.01)
*H04L 43/028* (2022.01)

(52) U.S. Cl.
CPC ............ *H04L 43/55* (2022.05); *H04L 43/028* (2013.01)

(58) Field of Classification Search
None
See application file for complete search history.

(56) References Cited

U.S. PATENT DOCUMENTS

| | | | |
|---|---|---|---|
| 11,455,641 B1* | 9/2022 | Shahidzadeh | ....... H04L 63/0892 |
| 11,552,975 B1* | 1/2023 | Zhang | ..................... H04L 63/08 |
| 2003/0225693 A1* | 12/2003 | Ballard | ............... G06Q 20/108 |
| | | | 705/42 |
| 2007/0266148 A1 | 11/2007 | Ruiz et al. | |
| 2018/0324153 A1* | 11/2018 | Althouse | ............... H04L 9/3236 |
| 2020/0050538 A1 | 2/2020 | Schmalz, Jr. | |
| 2020/0213206 A1* | 7/2020 | Bracken | ................ H04L 67/303 |

OTHER PUBLICATIONS

PCT International Search Report and Written Opinion dated Feb. 22, 2023 in International Application No. PCT/US2022/048259.

* cited by examiner

*Primary Examiner* — Phyllis A Book
(74) *Attorney, Agent, or Firm* — Foley & Lardner LLP (57) ABSTRACT

Correlating captured packets with synthetic application testing is provided. A device captures packets associated with a plurality of processes that include one or more synthetic transactions and one or more transactions responsive to user input. A packet capture data set can lack process identifiers (PIDs). The device captures first finger-printing data including first PIDs and attributes associated with the plurality of processes, and second finger-printing data comprising second PIDs corresponding to the one or more synthetic transactions. The device applies a first filter generated from the second PIDs in the second finger-printing data to a first finger-printing data set, and a second filter generated from the filtered attributes of a filtered finger-printing data set to the packet capture data set. The device provides a filtered packet capture data set to manage a performance of one or more processes of the plurality of processes.

20 Claims, 5 Drawing Sheets

CORRELATING CAPTURED PACKETS WITH SYNTHETIC APPLICATION TESTING

CROSS-REFERENCE TO RELATED APPLICATION

This application is related to and claims priority under 35 U.S. § 119(e) the U.S. Provisional Patent Application No. 63/278,909, filed Nov. 12, 2021, titled "CORRELATING CAPTURED PACKETS WITH SYNTHETIC APPLICATION TESTING," the entire contents of which are incorporated herein by reference for all purposes.

BACKGROUND

Digital services can be provided by servers to client devices over a network, such as the Internet. For example, servers can provide access to web sites, applications, content, or other digital services. Providers or users of the digital services can periodically test the digital services and content to evaluate the performance of the digital services, or identify issues associated with providing the digital services. However, due to the sharing of various networks used by client devices to access digital services, it can be challenging to analyze data packets to evaluate the test of the digital service.

SUMMARY

Systems and methods of this technical solution are directed to correlating captured packets with one or more synthetic transactions. Client devices can access, via a network, a digital service (e.g., cloud service or application) hosted or provided by a service provider. The application can be a software-as-a-service ("SaaS") that executes on a server remote from the client device. To evaluate a performance of the service, a synthetic transaction generator can conduct a synthetic transaction with packets. However, since the client device executing the synthetic transaction generator can provide, via a same one or more network interfaces, data packets not related to the synthetic transaction, it may not be possible to distinguish the packets corresponding to the synthetic transaction from the packets not corresponding to the synthetic transaction. Thus, systems and methods of this technical solution can provide a captured packet correlator that captures the data packets, captures metadata associated with the data packets, and, using the metadata, filters the data packets to generate a data set corresponding to the synthetic tests.

At least one aspect is directed to a method. The method can be performed by one or more processors. For example, the method can be performed by one or more processors of a client device or one or more processors of a cloud computing system via a virtual machine. The method can include the one or more processors capturing packets associated with a plurality of processes communicated via one or more network interfaces of the computing device to generate a packet capture data set. The plurality of processes can include one or more synthetic transactions and one or more transactions responsive to user input. The packet capture data set can lack process identifiers (PIDs). The method can include the one or more processors capturing first finger-printing data including first PIDs and attributes associated with the plurality of processes to generate a first finger-printing data set. The method can include the one or more processors capturing second finger-printing data comprising second PIDs corresponding to the one or more synthetic transactions to generate a second finger-printing data set. The method can include the one or more processors applying a first filter generated from the second PIDs in the second finger-printing data to the first finger-printing data set to generate a filtered finger-printing data set including filtered attributes. The method can include the one or more processors applying a second filter generated from the filtered attributes of the filtered finger-printing data set to the packet capture data set to generate a filtered packet captured data set. The method can include the one or more processors providing the filtered packet capture data set to manage a performance of one or more processes of the plurality of processes.

At least one aspect is directed to a system. The system can include one or more processors. For example, the system can be performed by one or more processors of a client device or one or more processors of a cloud computing system via a virtual machine. The system can include the one or more processors capturing packets associated with a plurality of processes communicated via one or more network interfaces of the computing device to generate a packet capture data set. The plurality of processes can include one or more synthetic transactions and one or more transactions responsive to user input. The packet capture data set can lack process identifiers (PIDs). The system can include the one or more processors capturing first finger-printing data including first PIDs and attributes associated with the plurality of processes to generate a first finger-printing data set. The system can include the one or more processors capturing second finger-printing data comprising second PIDs corresponding to the one or more synthetic transactions to generate a second finger-printing data set. The system can include the one or more processors applying a first filter generated from the second PIDs in the second finger-printing data to the first finger-printing data set to generate a filtered finger-printing data set including filtered attributes. The system can include the one or more processors applying a second filter generated from the filtered attributes of the filtered finger-printing data set to the packet capture data set to generate a filtered packet captured data set. The system can include the one or more processors providing the filtered packet capture data set to manage a performance of one or more processes of the plurality of processes.

At least one aspect is directed to a non-transitory computer readable medium. The medium can include instructions stored thereon. The instructions, when executed by one or more processors, can cause the one or more processors to perform operations. The operations can include the one or more processors capturing packets associated with a plurality of processes communicated via one or more network interfaces of the computing device to generate a packet capture data set. The plurality of processes can include one or more synthetic transactions and one or more transactions responsive to user input. The packet capture data set can lack process identifiers (PIDs). The operations can include the one or more processors capturing first finger-printing data including first PIDs and attributes associated with the plurality of processes to generate a first finger-printing data set. The operations can include the one or more processors capturing second finger-printing data comprising second PIDs corresponding to the one or more synthetic transactions to generate a second finger-printing data set. The operations can include the one or more processors applying a first filter generated from the second PIDs in the second finger-printing data to the first finger-printing data set to generate a filtered finger-printing data set including filtered attributes. The operations can include the one or more processors applying a second filter generated from the filtered attributes of the filtered finger-printing data set to the packet capture data set to generate a filtered packet captured data set. The operations can include the one or more processors providing the filtered packet capture data set to manage a performance of one or more processes of the plurality of processes.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatus, and systems of correlating packets with synthetic transactions. For example, the methods, apparatus, and systems can provide a captured packet correlator that captures data packets communicated between a client application and a remote service to generate a packet capture file and uses finger-printing data to filter the packet capture file to retain filtered packets associated with synthetic transaction packets. The technical solution can provide the filtered packets to a data processing system to process the filtered packets in real-time in order to evaluate the performance of the services. The technical solution can isolate the data packets corresponding to the synthetic tests from other data packets when the data packets can lack associated metadata that indicates an originating process identifier (PID). The various concepts introduced above and discussed in greater detail below may be implemented in any of numerous ways.

Organizations can provide digital services, such as a website or application, over a network. To test the availability or performance of the digital service, the organization can execute synthetic transactions. A synthetic transaction can refer to simulating activities performed by an application or client device accessing the digital service. The synthetic transaction can be performed at any time and can facilitate evaluating the availability and performance of a digital service at times when human users may be less active or not active. For example, if a business service becomes unavailable over the weekend, users of that service may not find out until Monday morning. However, by using synthetic transactions to test the availability and performance of a service at regular intervals (e.g., every hour) the operator can be alerted to any problems shortly after they occur and can take remedial action. By regularly performing the same types of synthetic transactions, a system of this technical solution can establish a baseline for normal behavior of a digital service. Upon detecting a deviation from the established baseline, the system can generate an alert notifying the operator of the digital service of a performance or availability issue.

For example, the digital service can include a collaboration service web site, sales management platform, or productivity software (e.g., word processing, spreadsheet application, presentation application, or cloud storage). The client device that accesses the digital service can be located at a residential location, such as their home location, house, apartment, or condominium. In some cases, the client device can include or refer to a physical device located at the residential location, and in some cases the client device can include or refer to a virtual machine hosted or running on one or more processors or servers in a cloud computing environment. The user's residential location can refer to a location that is different from a commercial location, such as the office or building of an organization. A synthetic transaction generator can execute on the client device. The synthetic transaction generator can execute in a container on the client device.

An illustrative synthetic business transaction test on the collaboration service web site can include the following sequence of individual tests: 1) log into the web site homepage; 2) join a meeting; 3) wait in the meeting; 4) leave the meeting; and 5) log out. The system can detect a problem with one or more of these tests. To debug or better understand the problem in order to resolve the problem, an operator of the digital service can view the contents of the data packets that were sent between the client device and the web server providing the digital service. Viewing the contents allows for detailed troubleshooting, including inspecting the different hypertext transfer protocol ("HTTP") headers generated by both the client device and the server, the HTTP response codes generated for different subcomponents of an HTTP page, or code such as Javascript.

To obtain the data packets transmitted between the client device at the residential location and the server hosting the digital service, the client device can include a synthetic transaction generator that generates a packet capture trace file. The synthetic transaction generator can include or refer to a packet monitoring probe. The synthetic transaction generator can be a standalone device or software component executed by a client device. The synthetic transaction generator can generate data packets associated with one or more synthetic transactions which are used to perform synthetic tests to manage performance of the client applications on the client device and the digital service.

However, it may be challenging to isolate the data packets corresponding to the synthetic tests from other data packets such as packets associated with background host processes or other applications of the client device. The network traffic between the client device and the digital service that is captured during a synthetic network test can include both of the data packets related to the synthetic tests and the data packets not related to the synthetic tests. Additionally, both of the data packets can be communicated through one or more same network interfaces. The data packets can lack associated metadata that indicates an originating process identifier (PID).

Thus, this technical solution can provide a captured packet correlator that captures the data packets, captures metadata associated with the data packets, and, using the metadata, filters the data packets to generate a data set corresponding to the synthetic tests. By doing so, this technical solution can isolate data packets related to synthetic tests and provide the data packets to manage the performance of the client applications and the digital service being tested. This technical solution can be achieved without the need to create artificial network interfaces to facilitate the packet capture.

Figure 1:
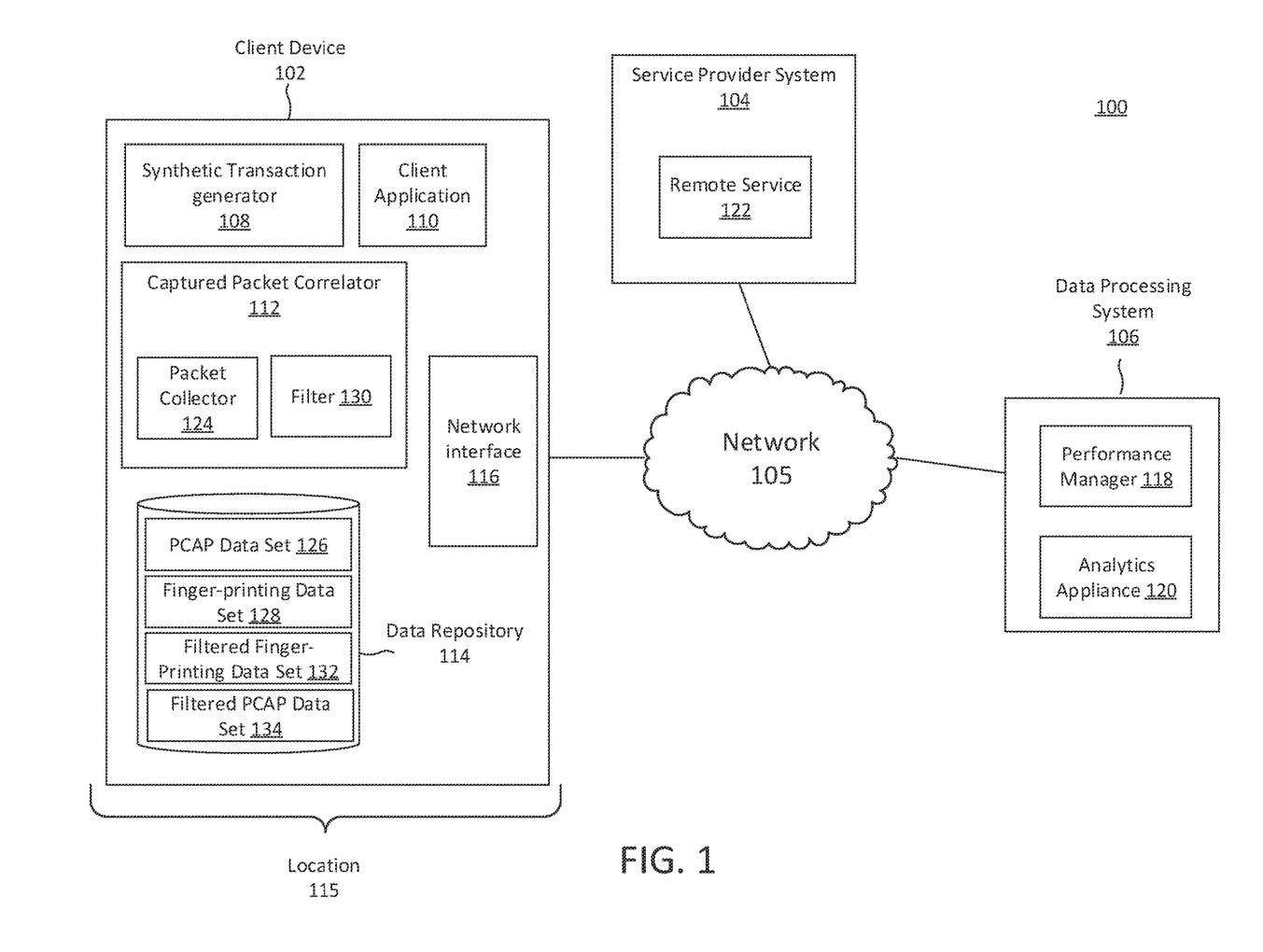
FIG. 1 is an illustration of a system to correlate captured packets, in accordance with an implementation.

FIG. 1 illustrates an example system 100 to generate synthetic transactions with packets. In brief overview, the system 100 can include, access or otherwise interface with one or more of a client device 102, service provider system 104 and data processing system 106. The client device 102 can include one or more processors. The client device 102 can include at least one synthetic transaction generator 108. The client device 102 can include a client application 110. The client device 102 can include at least one captured packet correlator 112. The client device 102 can include at least one data repository 114. The client device 102 can include one or more network interfaces 116. The client device 102 can communicate with a service provider system 104 via a network 105. The client device 102 can communicate with a data processing system 106 via network 105.

The data processing system 106 can include at least one application performance manager 118. The data processing system 106 can include at least one analytics appliance 120. The analytics appliance 120 can be a hardware appliance or software-based virtual appliance executed by one or more processors of the data processing system 106.

The service provider system 104 can be hosted by a third-party cloud service provider. The service provider system 104 can be hosted in a public cloud, a co-location facility, or a private cloud. The service provider system 104 can be hosted in a private data center, or on one or more physical servers, virtual machines, or containers of an entity or customer. The service provider system 104 can provide a remote service 122. The remote service 122 can be accessed or tested over a network 105. The remote service 122 can be a software-as-a-service (SaaS) application, such as a word processing application, spreadsheet application, presentation application, electronic message application, file storage system, productivity application, or any other SaaS application. The service provider system 104 can be hosted on or refer to cloud 310 depicted in FIG. 3B.

The data processing system 106, client device 102, or service provider system 104 can include or execute on one or more processors or computing devices (e.g., computing device 303 depicted in FIG. 3C) and communicate via network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device, such as a laptop, desktop, tablet, personal digital assistant, smart phone, portable computers, or speaker. For example, via the network 105, the client device 102 can access information or data provided by the remote service 122.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

Each of the client device 102, data processing system 106, or service provider system 104 can include or utilize at least one processing unit or other logic device such as programmable logic array engine, or module configured to communicate with one another or other resources or databases. The components of the client device 102, data processing system 106, and service provider system 104 can be separate components or a single component. The system 100 and its components can include hardware elements, such as one or more processors, logic devices, or circuits.

Still referring to FIG. 1, and in further detail, the client device 102 can include a client application 110. The client application 110 can refer to or include any program configured to access a (e.g., digital) remote service 122 provided by a server system (e.g., service provider system 104). The client application 110 can include, for example, a web browser that can communicate using a network protocol with a server system that provides a digital server. The client application 110 can include a mobile application, desktop application or other type of application that can access a remote service 122 provided by the server system. The client application 110 can at least one of generate, send, or receive packets that are sent to or received from the server system. The packets can be responsive to a user input. The packets can be associated with at least one of background host processes or user interaction with an operating system of the client device 102 or the client application 110. A background host process can refer to or include a computer process that can run behind the scenes without user intervention, such as logging, system monitoring, scheduling, or user notification.

The client device 102 can be located or deployed at any location in the network environment depicted in FIG. 1. The client device 102 can be deployed at a location 115. For example, the location 115 can refer to a residential location or non-commercial location, such as a user's home, house, apartment, condominium or other residential place. The location 115 can refer to where a user lives. The location 115 can be different from a commercial location or building at which an organization or entity may have its place of business. For example, the location 115 can be different from where the data processing system 106 is located or where the service provider system 104 is located.

The client device 102 can include a synthetic transaction generator 108 designed, constructed and operational to simulate activities performed by a client application 110 accessing the remote service 122. The synthetic transaction generator 108 can be configured with one or more functions or components of client application 110 in order to simulate the activities performed by the client application 110 to access the remote service 122. In some cases, the synthetic transaction generator 108 can communicate with the server (e.g., service provider system 104) to perform activities simulating accessing the remote service 122. In some cases, the synthetic transaction generator 108 can invoke or launch the client application 110. For example, the synthetic transaction generator 108 can launch the client application 110 and control the client application 110 in order to simulate the activity associated with the remote service 122. The synthetic transaction generator 108 can be a standalone application that includes the functionality of the client application 110 in order to conduct a synthetic transaction with the remote service 122.

The synthetic transaction generator 108 can generate a synthetic transaction. The synthetic transaction can be associated with a synthetic network test. For example, a synthetic network test can include a test that performs a domain name system (DNS) resolve to get the internet protocol ("IP") address for an internet hosted application and then performs an HTTP GET to download the document object model ("DOM") of the remote service 122 (e.g., a web site).

The client device 102 and service provider system 104 (or remote service 122) can establish a secure communication channel or secure communication session. For example, the client device 102 and the service provider system 104 can communicate using HTTPS requests and responses. HTTPS responses and requests can refer to HTTP responses and requests that are encrypted, such an encryption based on the TLS protocol. The client device 102 and service provider system 104 can communicate network packets responsive to establishing the secure communication channel/session.

The client device 102 can include a captured packet correlator 112 designed, constructed and operational to correlate packets with metadata (e.g., processes and attributes) associated with synthetic network test traffic. In other words, the captured packet correlator 112 can isolate synthetic network test traffic, such as packets generated by the synthetic transaction generator 108, from background host traffic, such as packets generated or provided by the client application 110. In implementations, the client device 102 can be referred to as the captured packet correlator 112. For example, the captured packet correlator 112 can be a standalone device or component that includes hardware and software that can isolate synthetic network test traffic.

The captured packet correlator 112 can include a packet collector 124 designed, constructed and operational to collect (e.g., capture, receive, record, etc.) packets and finger-printing data. The packet collector 124 can capture the finger-printing data packets separately and in parallel to capturing the finger-printing data.

The packet collector 124 can collect packets associated with a number of processes of the client device 102. The number of processes can include one or more synthetic transactions generated by the synthetic transaction generator 108. The number of processes can include one or more transactions responsive to user input ("user transactions"). For example, the user transactions can include, or otherwise be associated with, background host processes (e.g., operating system updates, synching network shares, domain controller communications) or user interaction with an operating system operating system.

The number of processes can be communicated (e.g., sent, transmitted) between the client device 102 and the remote service 122. The number of processes can be communicated via one or more network interfaces 116. The one or more network interfaces 116 can include one or more of an Ethernet interface, a Wi-Fi interface, or a virtual private network (VPN) interface. In implementations, the synthetic transactions can be communicated on a different one or more of the network interfaces 116 than the one or more of the network interfaces 116 on which the user transactions are sent. In implementations, the synthetic transactions and the user transactions can be sent on the same one or more network interfaces 116.

The packet collector 124 can collect the packets associated with the number of processes to generate a packet capture ("PCAP") data set 126. In implementations, the PCAP data set 126 may not include any metadata containing a process identifier ("PID") such as a PID that originated the packets. The packet collector 124 can store the PCAP Data Set 126 in the data repository 114.

The packet collector 124 can capture finger-printing data. The packet collector 124 can capture first finger-printing data that includes metadata such as PIDs and attributes associated with the number of processes. Each PID can identify a process that a packet originated from. Each attribute can identify characteristics related to transmission of the one or more packets. The attributes can include at least one of a source IP address, a destination IP address, a source port, or a destination port. The source IP address and source port can correspond to one of the client device, the synthetic transaction generator 108, or the client application 110, and the destination IP address and destination port can correspond to one of the service provider system 104 or the remote service 122, or vice versa. The attributes can include a protocol being used for transmission of the more packets. The protocol can include transmission control protocol ("TCP"), user datagram protocol ("UDP"), or Internet Control Message Protocol ("ICMP"). The attributes can include a domain name server ("DNS") query name.

The attributes can include events. The events can include TCP events or UDP events. The event can include at least one of an indication that a packet was sent, a timestamp of the packet transmission, the source IP address, the destination IP address, the source port, or the destination port.

The packet collector 124 can capture the metadata (e.g., attributes such as TCP events, UDP events, and DNS query names) using an event tracing script for an operating system running on the client device 102. For example, the packet collector 124 can use Event Tracing for Windows (ETW). An event tracing script can refer to or include a tracing mechanism for events raised by user-mode applications or kernel-mode device drivers. Event tracing script can include or interface with an event provider that writes events to an event tracing session. When the events are written, the event tracing script or program can add additional information about the event, such as the time the event took place, process identifier, a thread that generated the event, a processor number, or CPU usage data of the logging thread.

The synthetic transaction generator 108 can run a synthetic test. The packet collector 124 can capture second finger-printing data that includes PIDs associated with the one or more synthetic transactions corresponding to the synthetic test. The packet collector can capture the packets and the metadata associated with the number of processes while the synthetic test is running.

The packet collector 124 can capture finger-printing data to generate a finger-printing data set 128. For example, the packet collector 124 can capture first finger-printing data to generate a first finger-printing data set. The packet collector 124 can capture second finger-printing data to generate a second finger-printing data set. The finger-printing data set 128 can include the first finger-printing data set and the second finger-printing data set. The packet collector 124 can store the finger-printing data set 128 in the data repository 114.

The captured packet correlator 112 can include a filter 130 designed, constructed and operational to filter packets and finger-printing data. The filter 130 can access the finger-printing data set 128 stored in the data repository 114. The filter 130 can access the PIDs corresponding to the one or more synthetic transactions from the second finger-printing data set of the finger-printing data set 128. The filter 130 can generate a first filter from the PIDs corresponding to the one or more synthetic transactions. The filter 130 can apply the first filter to the first finger-printing data set of the finger-printing data set 128. The filter 130 can apply the first filter to generate a filtered finger-printing data set 132. The filtered finger-printing data set 132 can include attributes and PIDs corresponding to the one or more synthetic transactions. The filter 130 can store the filtered finger-printing data set 132 in the data repository 114. The filter 130 can discard a subset of the finger-printing data set 128 not included in the filtered finger-printing data set 132. For example, the filter 130 can remove, delete, disregard, erase, or otherwise not use the subset of the finger-printing data set 128.

The filter 130 can access the attributes corresponding to the one or more synthetic transactions from the filtered finger-printing data set 132 stored in the data repository 114. The filter 130 can generate a second filter from the attributes corresponding to the one or more synthetic transactions. The filter 130 can apply the second filter to the PCAP data set 126. The filter 130 can apply the second filter to generate a filtered PCAP data set 134. The filter 130 can store the filtered PCAP data set 134 in the data repository 114. The filter 130 can discard a subset of the PCAP data set 126 not included in the filtered PCAP data set 134.

The captured packet correlator 112 can access the filtered PCAP data set 134 stored in the data repository 114. The captured packet correlator 112 can provide the filtered PCAP data set to the data processing system 106. The data processing system 106 (e.g., the performance manager 118 or the analytics appliance 120) can manage a performance of one or more of the processes such as a process corresponding to the client application 110 or the remote service 122.

The data processing system 106 can include an application performance manager 118. The application performance manager 118 can allow a user or operator of the data processing system 106 to select a packet trace via a graphical user interface ("GUI"). A user of the data processing system 106 can drill down or navigate through the GUI provided by the application performance manager 118 to identify, evaluate, generate or otherwise assess various metrics, such as the synthetic transaction test response time, the ISP, location information, the unique ID of the synthetic transaction generator 108 or the captured packet correlator 112, and the laptop name or user identifier.

The data processing system 106 can include an analytics appliance 120. The analytics appliance 120 can be designed, constructed and operational to generate a metric or otherwise provide an indicator of the availability or performance of the remote service 122 being tested. The analytics appliance 120 can access the data packets and analyze the data packets. The analytics appliance 120 can identify a test status code in the packets that can indicate whether the test was a success. The analytics appliance 120 can determine a duration of the test, and generate a metric based on the duration of the test. The analytics appliance 120 can parse data in the data packets, such as data in the HTTP request and response data packets. The data can include codes indicating a status or state of the HTTP request or response.

The data processing system 106 can compare the metric generated for the test with a performance threshold stored in a threshold data structure, and generate an alert based on the comparison. The data processing system 106 can transmit the alert or a notification to an operator device, such as the client device 102, via a push notification, electronic message, text message, or other electronic communication.

In some cases, the data processing system 106 can be configured to provide an indication to adjust a configuration of the client device 102, remote service 122 or service provider system 104 based on the performance information or comparison between the metric and the threshold performance. The data processing system 106 can (e.g., automatically or responsive to the comparison) adjust or modify a configuration of the client device 102 or remote service 122 (e.g., application) executed by the one or more servers to improve performance of the remote service 122. For example, the data processing system 106 can restart a server of the service provider system 104 that hosts the remote service 122, allocate additional memory or storage to the remote service 122, allocate a faster processor to the remote service 122, allocate additional network bandwidth to the remote service 122, or download a patch or software update to the remote service 122.

Figure 2:
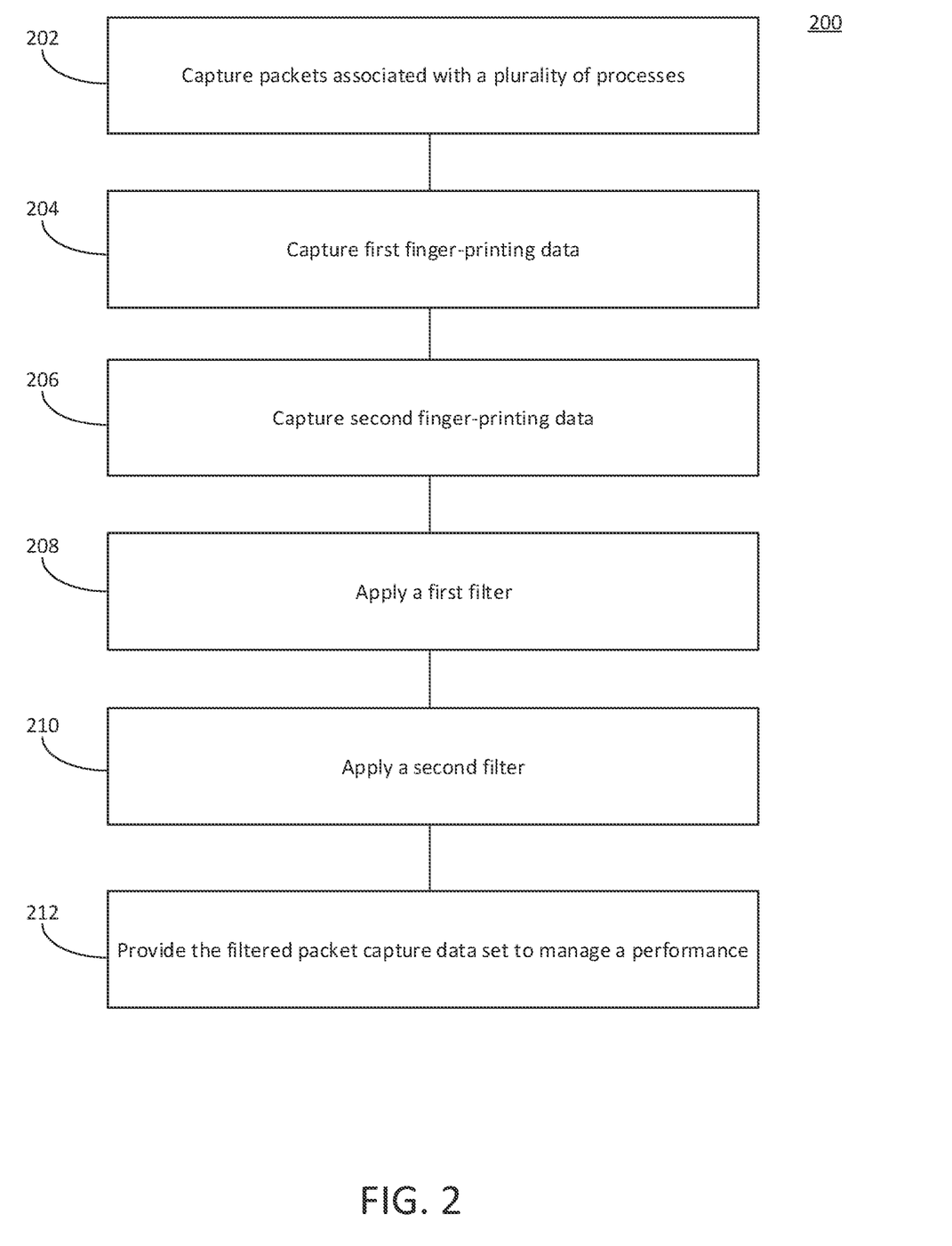
FIG. 2 is an illustration of a method of correlating captured packets, in accordance with an implementation.

FIG. 2 is an illustration of a method of correlating captured packets with one or more synthetic transactions, in accordance with an implementation. The method 200 can be performed by one or more system, component or module depicted in FIG. 1, 3A, 3B, or 3C, including, for example, a computing device (e.g., client device 102), captured packet correlator (e.g., captured packet correlator 112), data processing system (e.g., data processing system 106), cloud service provider system (e.g., service provider system 104), or one or more processors of any of the above. At operation 202, the data processing system can capture packets associated with a plurality of processors. For example, the captured packet correlator can capture packets associated with a plurality of processes to generate a packet capture data set. The plurality of processes can include one or more synthetic transactions and one or more transactions responsive to user input. The packet capture data set can lack process identifiers (PIDs). The PIDs can identify processes from which the packets originated.

The plurality of processes can be communicated via one or more (e.g., two or more) network interfaces of the computing device. The one or more network interfaces include one or more of an Ethernet interface, a Wi-Fi interface, or a virtual private network (VPN) interface. The captured packet correlator can capture packets associated with one or more synthetic transactions on a first one or more of the network interfaces and packets associated with one or more transactions responsive to user input on a second one or more of the network interfaces different from the first one or more of the network interfaces. The first one or more network interfaces can be overlapping with the second one or more network interfaces. The first one or more network interfaces can be the same as the second one or more network interfaces.

At operation 204, the data processing system can capture first finger-printing data. The captured packet correlator can capture first finger-printing data including first PIDs and attributes associated with the plurality of processes to generate a first finger-printing data set. The attributes can include at least one of a source internet protocol (IP)

address, a destination IP address, a source port, a destination port, a protocol, or a domain name server (DNS) query name. The attributes can include events. The captured packet correlator can capture events on transmission control protocol (TCP) and user datagram protocol (UDP) packets. The captured packet correlator can capture events using an event tracing script for an operating system running on the computing device.

At operation 206, the data processing system can capture second finger-printing data. For example, the captured packet correlator can capture second finger-printing data comprising second PIDs corresponding to the one or more synthetic transactions to generate a second finger-printing data set. The captured packet correlator can capture the packets separately and in parallel to the capturing of the first and second finger-printing data. The captured packet correlator can capture the first finger-printing data separately and in parallel to the capturing of the second finger-printing data.

At operation 208, the data processing system can apply a first filter. For example, The captured packet correlator can apply a first filter generated from the second PIDs in the second finger-printing data to the first finger-printing data set to generate a filtered finger-printing data set including filtered attributes. For example, the captured packet correlator can compare a PID from the first finger-printing data set to one or more of the second PIDs in the second finger-printing data set to determine if the PID matches one of the second PIDs. If the match is found, the captured packet correlator can add the PID and the attributes associated with the PID to the filtered finger-printing data set. The captured packet correlator can discard, or otherwise filter out, a subset of the first finger-printing data set not included in the filtered finger-printing data set.

At operation 210, the data processing system can apply a second filter. For example, the captured packet correlator can apply a second filter generated from the filtered attributes of the filtered finger-printing data set to the packet capture data set to generate a filtered packet capture data set. For example, the captured packet correlator can compare an attribute from the packet capture data set to one or more of the filtered attributes in the filtered finger-printing data set to determine if the attribute matches one of the filtered attributes. If the match is found, the captured packet correlator can add the attribute and the packet and other attributes associated with the attribute to the filtered packet capture data set. The captured packet correlator can discard, or otherwise filter out, a subset of the packet capture data set not included in the filtered packet capture data set.

At operation 212, the data processing system can provide the filtered packet capture data set to manage a performance. For example, the captured packet correlator can provide the filtered packet capture data set to manage a performance of one or more processes of the plurality of processes. For example, the captured packet correlator can provide the filtered packet capture data set to a data processing system to manage a performance of one or more processes of the plurality of processes. The filtered packet capture data set can include only the packets associated with the synthetic transaction, and lack packets associated with other background host processes or user interaction with the operating system of the client device. The data processing system can compare data the filtered packet capture data set corresponding to the one or more processes to a performance threshold. The data processing system can generate an alert based on the comparison, for example, if the data exceeds the threshold.

In an illustrative example, one or more aspects of methods 200 can be performed based at least in part on using the following pseudo-code:

```
runTestInstance( )
    startCaptureProcess( )
    PIDs = executeSytheticNetworkTest( )
    Packets, NetworkEvents, DNSQueryNames = stopCaptureProcess( )
    postFilterCapture(Packets, PIDs, NetworkEvents, DNSQueryNames)
startCaptureProcess( )
    startRecordingEtwNetworkEvents( )
    startRecordingEtwDnsClientEvents( )
    startPacketCapture( )
stopCaptureProcess( )
    NetworkEvents = stopRecordingEtwNetworkEvents( )
    DNSQueryNames = stopRecordingEtwDnsClientEvents( )
    Packets = stopPacketCapture( )
    return Packets, NetworkEvents, DNSQueryNames
postCaptureFilter(Packets, PIDs, NetworkEvents, DNSQueryNames)
    EventsFilter = buildEventsFilter(PIDs, NetworkEvents)
    DnsFilter = "udp and port 53"
    IcmpFilter = "icmp"
    for packet in Packets
        if includePacket(packet, PIDs, DNSQueryNames, EventsFilter,
DnsFilter, IcmpFilter)
            savePacket(packet)
        else
            discardPacket(packet)
    buildEventsFilter(PIDs, NetworkEvents)
        for pid in PIDs
            for event in NetworkEvents @ pid
                if filter not empty
                    filter.append(" or ")
                filter.append(
                    "(src host event, srcip and event.protocol src port
event.srcport and
                    dst host event.destip and event.protocol dst port event.destport)")
        return filter
    includePacket(packet, PIDs, DNSQueryNames, EventsFilter, DnsFilter, IcmpFilter)
        if packet matches EventsFilter
```

```
            return true
        if packet matches DnsFilter
            return includeDnsPacket(packet, PIDs, DNSQueryNames)
        if packet matches IcmpFilter
            return true
    return false
includeDnsPacket(packet, PIDs, DNSQueryNames)
    for pid in PIDs
        for queryName in DNSQueryNames @ pid
            if packet.queryName = queryName
                return true
            if packet.queryName = queryName + suffix
                return true
    return false
```

Figure 3A:
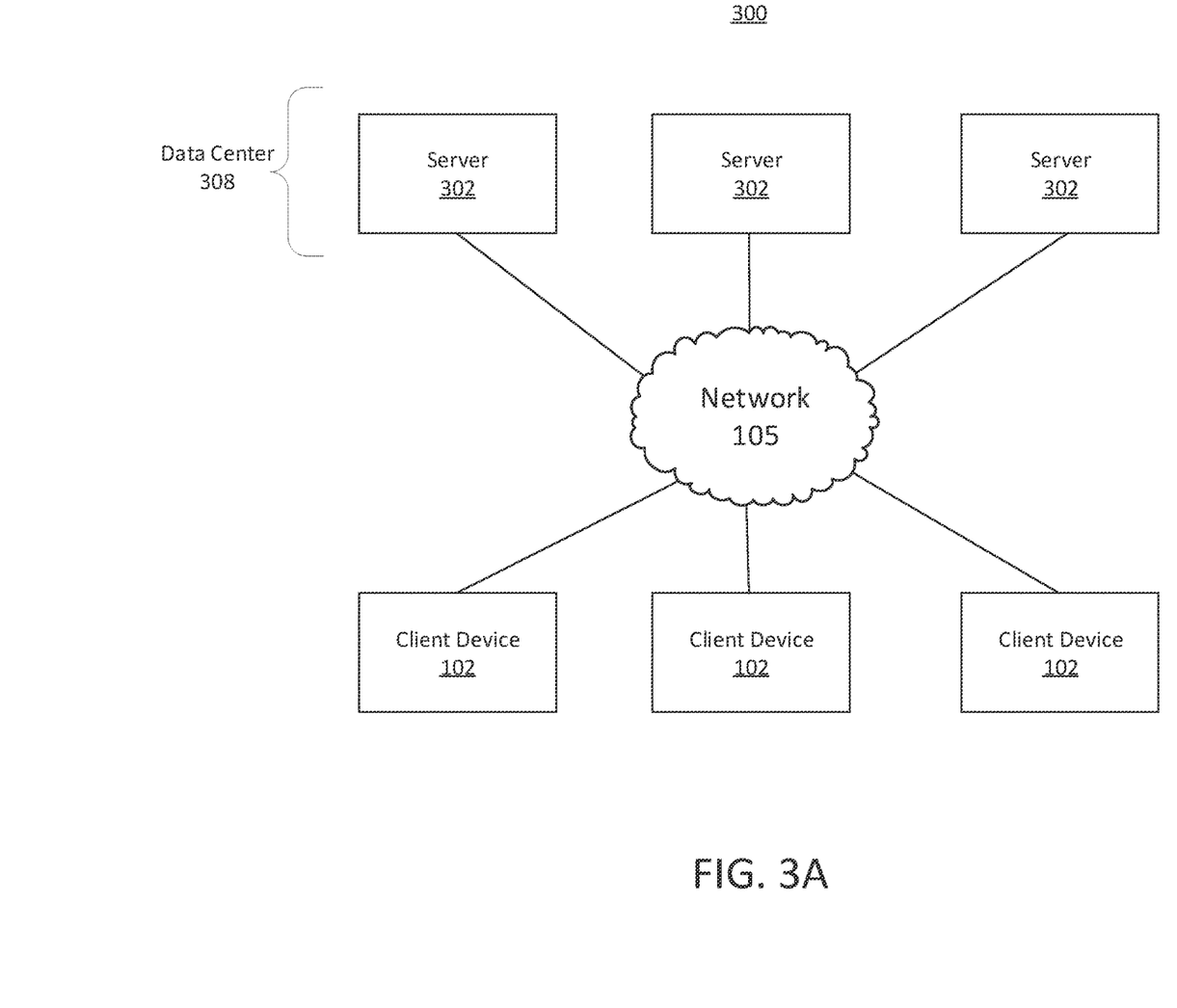
FIG. 3A is a block diagram depicting an implementation of a network environment including a client device in communication with a server device.

FIG. 3A depicts an example network environment that can be used in connection with the methods and systems described herein. In brief overview, the network environment 300 includes one or more clients devices 102 (also generally referred to as clients, client node, client machines, client computers, client computing devices, endpoints, or endpoint nodes) in communication with one or more servers 302 (also generally referred to as servers, nodes, or remote machine) via one or more networks 105. In some embodiments, a client device 102 has the capacity to function as both a client node seeking access to resources provided by a server and as a server providing access to hosted resources for other clients 102.

Although FIG. 3A shows a network 105 between the clients 102 and the servers 302, the clients 102 and the servers 302 can be on the same network 105. In embodiments, there are multiple networks 105 between the clients 102 and the servers 302. The network 105 can include multiple networks such as a private network and a public network. The network 105 can include multiple private networks.

The network 105 can include one or more component or functionality of network 105 depicted in FIG. 3A. The network 105 can be connected via wired or wireless links. Wired links can include Digital Subscriber Line (DSL), coaxial cable lines, optical fiber lines, shielded twisted pairs, or unshielded twisted pairs. The wired links can connect one or more Ethernet networks. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g. Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 300 can include multiple, logically grouped servers 302. The logical group of servers can be referred to as a data center 308 (or server farm or machine farm). In embodiments, the servers 302 can be geographically dispersed. The data center 308 can be administered as a single entity or different entities. The data center 308 can include multiple data centers 308 that can be geographically dispersed. The servers 302 within each data center 308 can be homogeneous or heterogeneous (e.g., one or more of the servers 302 or machines 302 can operate according to one type of operating system platform (e.g., WINDOWS), while one or more of the other servers 302 can operate on according to another type of operating system platform (e.g., Unix, Linux, or Mac OS)). The servers 302 of each data center 308 do not need to be physically proximate to another server 302 in the same machine farm 308. Thus, the group of servers 302 logically grouped as a data center 308 can be interconnected using a network. Management of the data center 308 can be de-centralized. For example, one or more servers 302 can comprise components, subsystems and modules to support one or more management services for the data center 308.

Server 302 can be a file server, application server, web server, proxy server, appliance, network appliance, gateway, gateway server, virtualization server, deployment server, SSL VPN server, or firewall. In embodiments, the server 302 can be referred to as a remote machine or a node. Multiple nodes can be in the path between any two communicating servers.

Figure 3B:
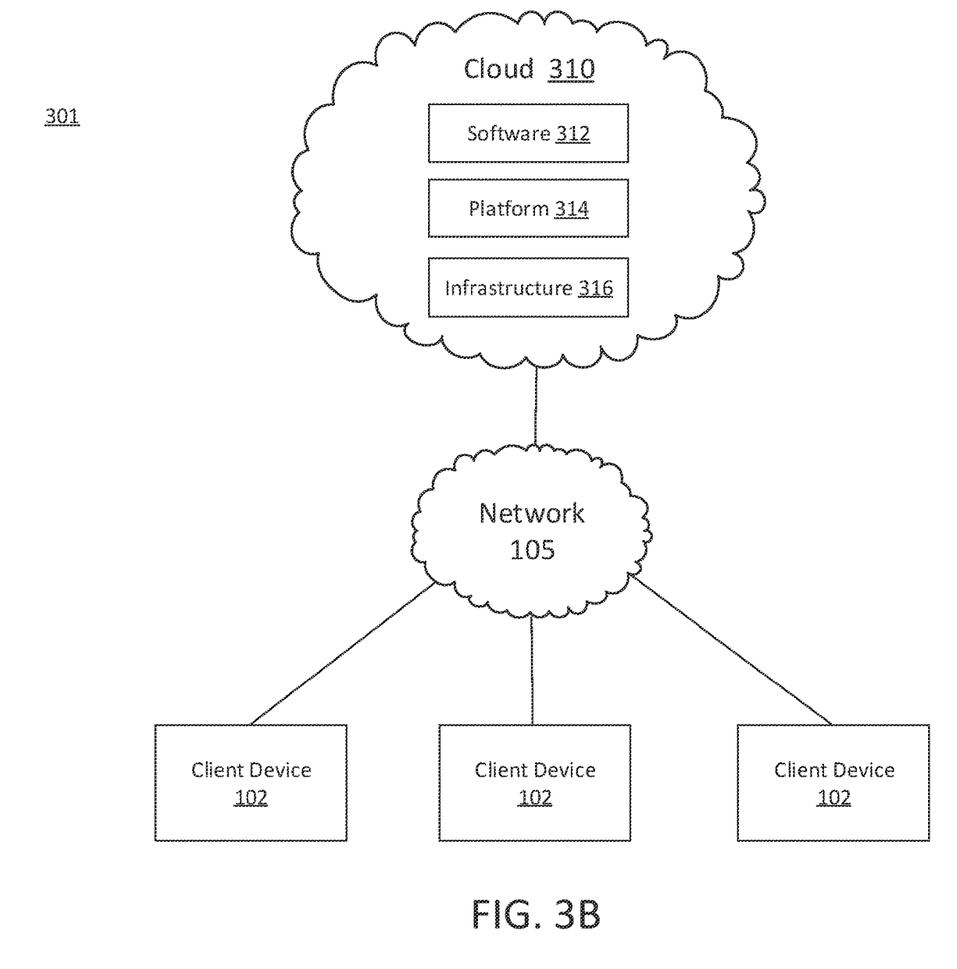
FIG. 3B is a block diagram depicting a cloud computing environment including a client device in communication with cloud service providers.

FIG. 3B illustrates an example cloud computing environment. A cloud computing environment 301 can provide client device 102 with one or more resources provided by a network environment. The cloud computing environment 301 can include one or more clients 102, in communication with the cloud 310 over one or more networks 105. Clients 102 can include, e.g., thick clients, thin clients, and zero clients. A thick client can provide at least some functionality even when disconnected from the cloud 310 or servers 302. A thin client or a zero client can depend on the connection to the cloud 310 or server 302 to provide functionality. A zero client can depend on the cloud 310 or other networks 105 or servers 302 to retrieve operating system data for the client device. The cloud 310 can include back end platforms, e.g., servers 302, storage, server farms or data centers.

The cloud 310 can be public, private, or hybrid. Public clouds can include public servers 302 that are maintained by third parties to the clients 102 or the owners of the clients. The servers 302 can be located off-site in remote geographical locations as disclosed above or otherwise. Public clouds can be connected to the servers 302 over a public network. Private clouds can include private servers 302 that are physically maintained by clients 102 or owners of clients. Private clouds can be connected to the servers 302 over a private network 105. Hybrid clouds can include both the private and public networks 105 and servers 302.

The cloud 310 can also include a cloud-based delivery, e.g. Software as a Service (SaaS) 312, Platform as a Service (PaaS) 314, and Infrastructure as a Service (IaaS) 316. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Clients 102 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client device 102 and server 302 can be deployed as and/or executed on any type and form of computing device, e.g. a computer, network device or appliance capable of communicating on any type and form of network and performing the operations described herein.

Figure 3C:
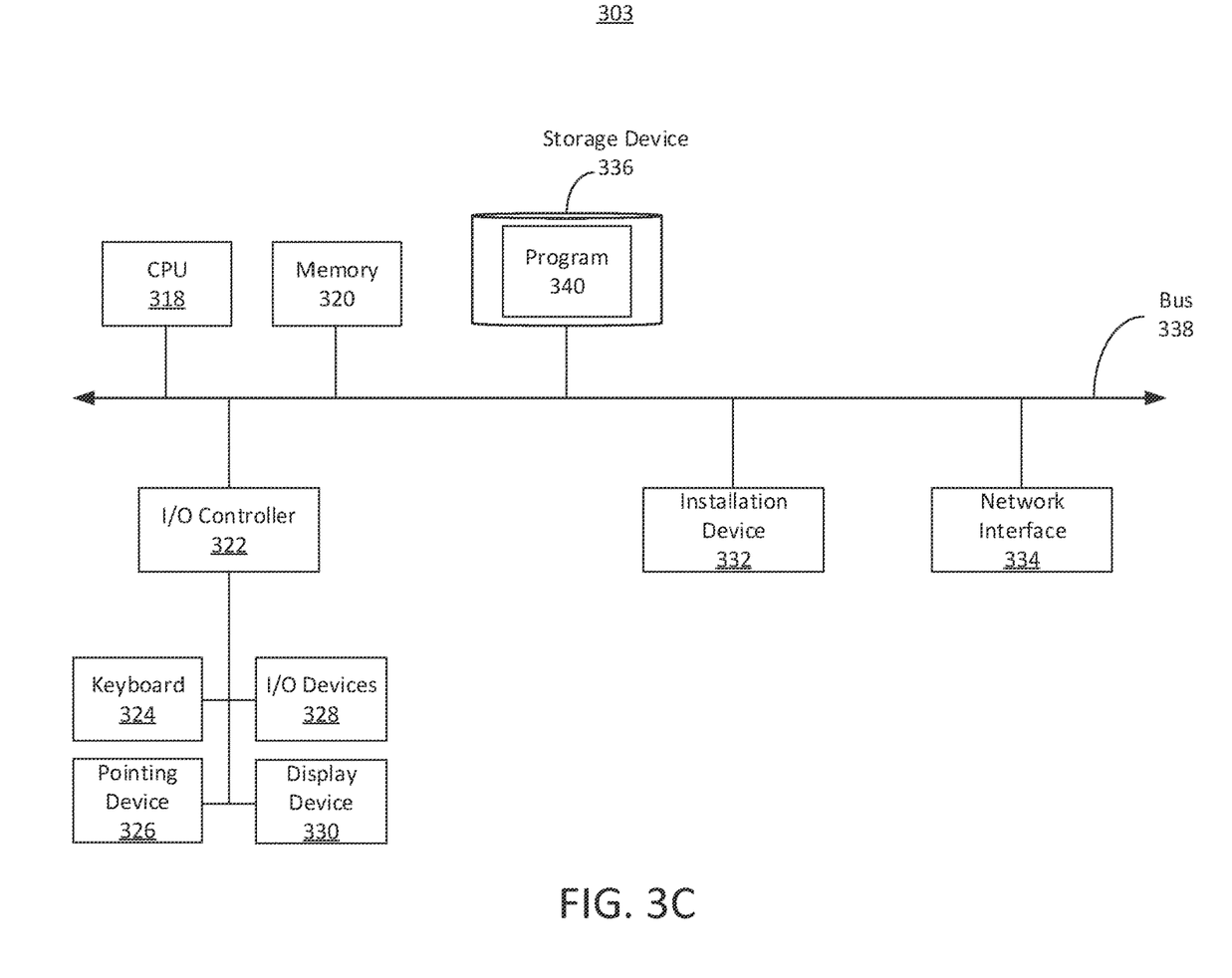
FIG. 3C is a block diagram depicting an implementation of a computing device that can be used in connection with the systems depicted in FIGS. 1, 3A and 3B, and the method depicted in FIG. 2.

FIG. 3C depicts block diagrams of a computing device 303 useful for practicing an embodiment of the client device 102 or a server 302. As shown in FIG. 3C, each computing device 303 can include a central processing unit 318, and a main memory unit 320. As shown in FIG. 3C, a computing device 303 can include one or more of a storage device 336, an installation device 332, a network interface 334, an I/O controller 322, a display device 330, a keyboard 324 or a pointing device 326, e.g. a mouse. The storage device 336 can include, without limitation, a program 340, such as an operating system, software, or software associated with system 100 or configured to perform one or more function of system 100 or method 200.

The central processing unit 318 is any logic circuitry that responds to and processes instructions fetched from the main memory unit 320. The central processing unit 318 can be provided by a microprocessor unit, e.g.: those manufactured by Intel Corporation of Mountain View, Calif. The computing device 303 can be based on any of these processors, or any other processor capable of operating as described herein. The central processing unit 318 can utilize instruction level parallelism, thread level parallelism, different levels of cache, and multi-core processors. A multi-core processor can include two or more processing units on a single computing component.

Main memory unit 320 can include one or more memory chips capable of storing data and allowing any storage location to be directly accessed by the microprocessor 318. Main memory unit 320 can be volatile and faster than storage 336 memory. Main memory units 320 can be Dynamic random access memory (DRAM) or any variants, including static random access memory (SRAM). The memory 320 or the storage 336 can be non-volatile; e.g., non-volatile read access memory (NVRAM). The memory 320 can be based on any type of memory chip, or any other available memory chips. In the example depicted in FIG. 3C, the processor 318 can communicate with memory 320 via a system bus 338.

A wide variety of I/O devices 328 can be present in the computing device 303. Input devices 328 can include keyboards, mice, trackpads, trackballs, touchpads, touch mice, multi-touch touchpads and touch mice, microphones, multi-array microphones, drawing tablets, cameras, or other sensors. Output devices 328 can include video displays, graphical displays, speakers, headphones, or printers.

I/O devices 328 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 328, display devices 330 or group of devices can be augmented reality devices. The I/O devices can be controlled by an I/O controller 322 as shown in FIG. 3C. The I/O controller 322 can control one or more I/O devices, such as, e.g., a keyboard 324 and a pointing device 326, e.g., a mouse or optical pen. Furthermore, an I/O device can also provide storage and/or an installation device 332 for the computing device 303. In embodiments, the computing device 303 can provide USB connections (not shown) to receive handheld USB storage devices. In embodiments, an I/O device 328 can be a bridge between the system bus 338 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 330 can be connected to I/O controller 322. Display devices can include, e.g., liquid crystal displays (LCD), electronic papers (e-ink) displays, flexile displays, light emitting diode displays (LED), or other types of displays. In some embodiments, display devices 330 or the corresponding I/O controllers 322 can be controlled through or have hardware support for OPENGL or DIRECTX API or other graphics libraries. Any of the I/O devices 328 and/or the I/O controller 322 can include any type and/or form of suitable hardware, software, or combination of hardware and software to support, enable or provide for the connection and use of one or more display devices 330 by the computing device 303. For example, the computing device 303 can include any type and/or form of video adapter, video card, driver, and/or library to interface, communicate, connect or otherwise use the display devices 330. In embodiments, a video adapter can include multiple connectors to interface to multiple display devices 330.

The computing device 303 can include a storage device 336 (e.g., one or more hard disk drives or redundant arrays of independent disks) for storing an operating system or other related software, and for storing application software programs such as any program related to the systems, methods, components, modules, elements, or functions depicted in FIG. 1 or 2. Examples of storage device 336 include, e.g., hard disk drive (HDD); optical drive including CD drive, DVD drive, or BLU-RAY drive; solid-state drive (SSD); USB flash drive; or any other device suitable for storing data. Storage devices 336 can include multiple volatile and non-volatile memories, including, e.g., solid state hybrid drives that combine hard disks with solid state cache. Storage devices 336 can be non-volatile, mutable, or read-only. Storage devices 336 can be internal and connect to the computing device 303 via a bus 338. Storage device 336 can be external and connect to the computing device 303 via an I/O device 328 that provides an external bus. Storage device 336 can connect to the computing device 303 via the network interface 334 over a network 105. Some client devices 102 may not require a non-volatile storage device 336 and can be thin clients or zero clients 102. Some storage devices 336 can be used as an installation device 332 and can be suitable for installing software and programs.

The computing device 303 can include a network interface 334 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac/ax, CDMA, GSM, WiMax and direct asynchronous connections). The computing device 303 can communicate with other computing devices 303 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Fla. The network interface 334 can include a built-in network adapter, network interface card, PCMCIA network card, EXPRESSCARD network card, card bus network adapter, wireless network adapter, USB network adapter, modem or any other device suitable for interfacing the computing device 303 to any type of network capable of communication and performing the operations described herein.

A computing device 303 of the sort depicted in FIG. 3C can operate under the control of an operating system, which controls scheduling of tasks and access to system resources. The computing device 303 can be running any operating system configured for any type of computing device, including, for example, a desktop operating system, a mobile device operating system, a tablet operating system, or a smartphone operating system.

The computing device 303 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 303 has sufficient processor power and memory capacity to perform the operations described herein. In some embodiments, the computing device 303 can have different processors, operating systems, and input devices consistent with the device.

In embodiments, the status of one or more machines (e.g., client devices 102 and servers 302) in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 303 in response to the CPU 318 executing an arrangement of instructions contained in main memory 320. Such instructions can be read into main memory 320 from another computer-readable medium, such as the storage device 336. Execution of the arrangement of instructions contained in main memory 320 causes the computing device 303 to perform the illustrative processes described herein. One or more processors in a multi-processing arrangement may also be employed to execute the instructions contained in main memory 320. Hard-wired circuitry can be used in place of or in combination with software instructions together with the systems and methods described herein. Systems and methods described herein are not limited to any specific combination of hardware circuitry and software.

Although an example computing system has been described in FIG. 3C, the subject matter including the operations described in this specification can be implemented in other types of digital electronic circuitry, or in computer software, firmware, or hardware, including the structures disclosed in this specification and their structural equivalents, or in combinations of one or more of them.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the captured packet correlator 112) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A computer-implemented method, comprising:
    capturing, by one or more processors of a computing device, packets associated with a plurality of processes communicated via one or more network interfaces of the computing device to generate a packet capture data set, the plurality of processes comprising one or more synthetic transactions and one or more transactions responsive to user input, the packet capture data set lacking process identifiers (PIDs);
    capturing, by the one or more processors, first finger-printing data including first PIDs and attributes associated with the plurality of processes to generate a first finger-printing data set;
    capturing, by the one or more processors, second finger-printing data comprising second PIDs corresponding to the one or more synthetic transactions to generate a second finger-printing data set;
    applying, by the one or more processors, a first filter generated from the second PIDs in the second finger-printing data to the first finger-printing data set to generate a filtered finger-printing data set including filtered attributes;
    applying, by the one or more processors, a second filter generated from the filtered attributes of the filtered finger-printing data set to the packet capture data set to generate a filtered packet capture data set; and
    providing, by the one or more processors, the filtered packet capture data set to manage a performance of one or more processes of the plurality of processes.

2. The method of claim 1, comprising:
    capturing, by the one or more processors, the first finger-printing data separately and in parallel to the capturing of the second finger-printing data.

3. The method of claim 1, wherein the attributes include at least one of a source internet protocol (IP) address, a destination IP address, a source port, a destination port, a protocol, or a domain name server (DNS) query name.

4. The method of claim 1, comprising:
discarding, by the one or more processors, a subset of the first finger-printing data set not included in the filtered finger-printing data set.

5. The method of claim 1, wherein the one or more network interfaces include one or more of an Ethernet interface, a Wi-Fi interface, or a virtual private network (VPN) interface.

6. The method of claim 1, wherein the one or more transactions responsive to the user input are associated with at least one of background host processes or user interaction with an operating system.

7. The method of claim 1, comprising:
capturing, by the one or more processors, events on transmission control protocol (TCP) and user datagram protocol (UDP) packets.

8. The method of claim 1, comprising:
capturing, by the one or more processors, events using an event tracing script for an operating system running on the computing device.

9. The method of claim 1, comprising:
capturing, by the one or more processors, the packets via at least two of the one or more network interfaces of the computing device.

10. A system, comprising:
one or more processors, coupled to memory, to:
capture packets associated with a plurality of processes communicated via one or more network interfaces of a computing device to generate a packet capture data set, the plurality of processes comprising one or more synthetic transactions and one or more transactions responsive to user input, the packet capture data set lacking process identifiers (PIDs);
capture first finger-printing data including first PIDs and attributes associated with the plurality of processes to generate a first finger-printing data set;
capture second finger-printing data comprising second PIDs corresponding to the one or more synthetic transactions to generate a second finger-printing data set;
apply a first filter generated from the second PIDs in the second finger-printing data to the first finger-printing data set to generate a filtered finger-printing data set including filtered attributes;
apply a second filter generated from the filtered attributes of the filtered finger-printing data set to the packet capture data set to generate a filtered packet capture data set; and
provide the filtered packet capture data set to manage a performance of one or more processes of the plurality of processes.

11. The system of claim 10, wherein the one or more processors are configured to:
capture the first finger-printing data separately and in parallel to the capturing of the second finger-printing data.

12. The system of claim 10, wherein the attributes include at least one of a source internet protocol (IP) address, a destination IP address, a source port, a destination port, a protocol, or a domain name server (DNS) query name.

13. The system of claim 10, wherein the one or more processors are configured to:
discard a subset of the first finger-printing data set not included in the filtered finger-printing data set.

14. The system of claim 10, wherein the one or more network interfaces include one or more of an Ethernet interface, a Wi-Fi interface, or a virtual private network (VPN) interface.

15. The system of claim 10, wherein the one or more transactions responsive to the user input are associated with at least one of background host processes or user interaction with an operating system.

16. The system of claim 10, wherein the one or more processors are configured to:
capture events on transmission control protocol (TCP) and user datagram protocol (UDP) packets.

17. The system of claim 10, wherein the one or more processors are configured to:
capture events using an event tracing script for an operating system running on the computing device.

18. The system of claim 10, wherein the one or more processors are configured to:
capture the packets via at least two of the one or more network interfaces of the computing device.

19. A non-transitory computer readable storage medium comprising instructions stored thereon that, when executed by one or more processors, cause the one or more processors to:
capture packets associated with a plurality of processes communicated via one or more network interfaces of a computing device to generate a packet capture data set, the plurality of processes comprising one or more synthetic transactions and one or more transactions responsive to user input, the packet capture data set lacking process identifiers (PIDs);
capture first finger-printing data including first PIDs and attributes associated with the plurality of processes to generate a first finger-printing data set;
capture second finger-printing data comprising second PIDs corresponding to the one or more synthetic transactions to generate a second finger-printing data set;
apply a first filter generated from the second PIDs in the second finger-printing data to the first finger-printing data set to generate a filtered finger-printing data set including filtered attributes;
apply a second filter generated from the filtered attributes of the filtered finger-printing data set to the packet capture data set to generate a filtered packet capture data set; and
provide the filtered packet capture data set to manage a performance of one or more processes of the plurality of processes.

20. The medium of claim 19, comprising instructions stored thereon that, when executed by the one or more processors, cause the one or more processors to:
capture the first finger-printing data separately and in parallel to the capturing of the second finger-printing data.

* * * * *